United States Patent [19]
Herb

[11] Patent Number: 4,642,008
[45] Date of Patent: Feb. 10, 1987

[54] EXPANSION DOWEL
[75] Inventor: Armin Herb, Peissenberg, Fed. Rep. of Germany
[73] Assignee: Hilti Aktiengesellschaft
[21] Appl. No.: 752,917
[22] Filed: Jul. 8, 1985
[30] Foreign Application Priority Data
  Jul. 9, 1984 [DE] Fed. Rep. of Germany ....... 3425237
[51] Int. Cl.⁴ .............................................. F16B 13/04
[52] U.S. Cl. ........................................ 411/16; 411/61; 411/479
[58] Field of Search ....................... 411/15, 16, 17, 18, 411/32, 33, 34, 38, 57, 60, 61, 62, 360, 362, 449, 479

[56] References Cited
U.S. PATENT DOCUMENTS

| 806,406 | 12/1905 | Farrington | 411/17 |
| 917,907 | 4/1909 | Taylor | 411/61 |
| 1,372,035 | 3/1921 | Ogden | 411/72 X |
| 1,666,805 | 4/1928 | Williams | 411/18 |
| 2,566,573 | 9/1951 | Lyon | 411/16 X |
| 2,823,572 | 2/1958 | Gisondi | 411/74 |
| 4,002,100 | 1/1977 | Bucheli | 411/61 |

FOREIGN PATENT DOCUMENTS

| 736625 | 6/1943 | Fed. Rep. of Germany | 411/16 |
| 2211713 | 9/1973 | Fed. Rep. of Germany | 411/18 |
| WO83/02648 | 8/1983 | PCT Int'l Appl. | 411/15 |
| 618808 | 2/1949 | United Kingdom | 411/15 |

Primary Examiner—Thomas J. Holko
Attorney, Agent, or Firm—Toren, McGeady and Goldberg

[57] ABSTRACT

An expansion dowel includes an axially elongated sleeve-shaped dowel body slit in the axial direction from the leading end. A spiral-shaped expansion body is located in the dowel body in the axially extending region of the slit. By axially displacing the expansion body toward the leading end of the dowel body it widens radially outwardly and in turn expands the axially slit region of the dowel body providing the required anchoring effect.

7 Claims, 12 Drawing Figures

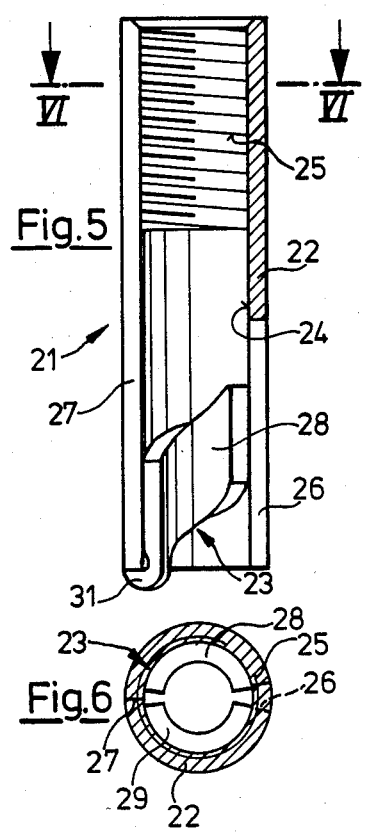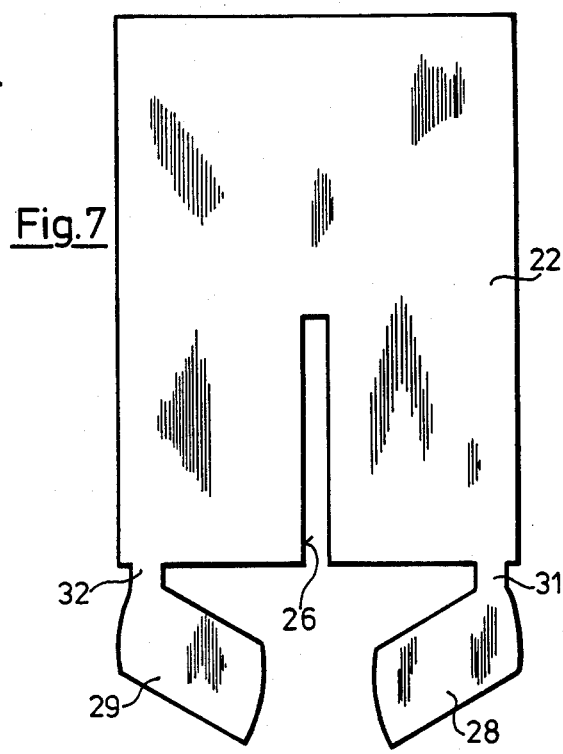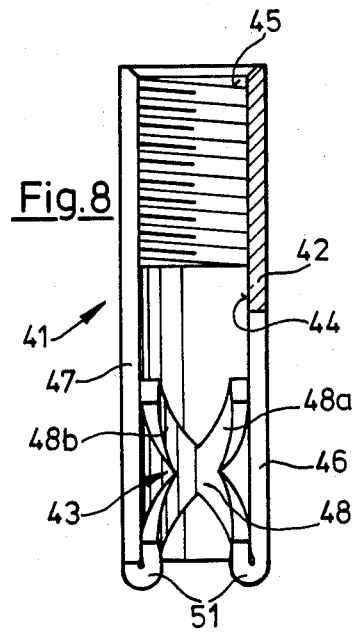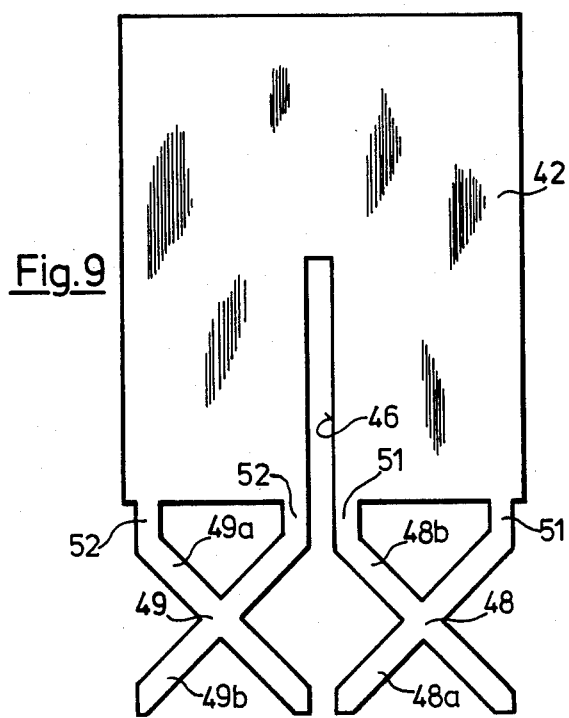

EXPANSION DOWEL

BACKGROUND OF THE INVENTION

The present invention is directed to an expansion dowel made up of a sleeve-shaped dowel body and an expansion element located in the central bore within the dowel body. The dowel body is provided with axially extending slits extending from its leading end and the body is radially expandable in the axially extending region of the slits by axially displacing the expansion element.

One requirement of expansion dowels is a simple installation procedure. Such a requirement is fulfilled mainly in known expansion dowels by an impact expansion operation. This type of expansion dowel includes a sleeve-shaped steel dowel body with a central bore having a section extending in the installation direction which tapers conically outwardly toward the leading end and an expansion element or body in the form of a cylindrically member which may also be made of steel. To expand the dowel body in a borehole in a receiving material, such as concrete, masonry or the like, the dowel body is provided with an axial slit extending from its leading end and preferably the expansioh element is driven forwardly by impact into the tapered section of the dowel bore. A considerable disadvantage of this type of expansion dowel is its high fabrication cost which results due to the large material expenditure and also because of the formation of the tapered central bore.

Another known expansion dowel type based on the same anchoring procedure is notable, because of its simpler production. This expansion dowel consists of a sleeve-shaped dowel body with a continuous cylindrically shaped bore and with axial slits provided in its axial region at the leading end, that is, the end first inserted into the receiving material. To anchor such a dowel, a plastically deformable expansion element, such as formed of lead or plastics material, is positioned in the bore of the dowel body and is upset or deformed. This procedure leads to an expansion of the dowel body in the receiving material borehole. In this anchoring procedure the radial deformation of the dowel body takes place in a non-uniform manner, since the greatest deformation occurs at the location where the resistance of the receiving material is smallest.

Another problem impeding the anchoring values of such an expansion dowel results from the escape of the material forming the expansion element, since it can flow during the deformation step through the axial slit and may also partially flow out of the dowel bore counter to the insertion direction. The region and degree of deformation of the dowel body during the expansion procedure is largely undefined.

SUMMARY OF THE INVENTION

Therefore, the primary object of the present invention is to provide an expansion dowel which can be easily installed and is characterized by high and dependable anchoring values and can be fabricated at low cost.

In accordance with the present invention, the expansion element is formed as a spiral or helically shaped body and the pitch or slope of the expansion element decreases during axial deformation while its radially outer shape is increased.

The spiral body is fabricated of strip steel, and, in its initial position, bears with a slight preload in self-locking engagement with the surface of the bore in the dowel body. In the anchoring operation, the spirally shaped body of the expansion dowel inserted into a borehole is displaced in the axial direction by a rod-like tool. As a result, the pitch of the spirally shaped body is decreased and, at the same time, its radially outer configuration is increased with a resultant radial expansion of the dowel body. In the anchoring operation, the spiral body can abut against the base of the borehole in the receiving material. The spiral body assures the attainment of specific anchoring values, since it cannot escape from the inside of the bore in the dowel body through the axial slit, because of the nature of its material. High anchoring values are also maintained in hard receiving material, even with cyclic loads, since the axial displacement of the spiral body retains its expanded position because of its assured deformation behavior under the remaining radial tension.

A spirally shaped body formed of one winding or turn is especially simple to produce with the single turn extending around the entire inside surface of the dowel bore. The spirally shaped body can also be formed of several turns, one adjoining the other around the surface of the dowel bore. The advantage of such an arrangement is the attainment of radial expandability of the dowel body over a relatively long axial section.

In another embodiment of the invention, the spirally shaped body is made up of two spirally shaped parts with windings of oppositely directed pitches each extending over half of the inside circumference of the dowel bore. The spirally shaped parts are connected together to form a single unit, for instance, by a crossing connection. The advantage of two or more spiral parts involves the axially symmetrical application of the deforming force on the spirally shaped body so that from the outset the deforming force assures a uniform distribution of radial forces expanding the dowel body around the inside of the bore.

With the arrangement embodying the present invention, the dowel body can be anchored as close to the bottom of the receiving material borehole as is possible with the spiral parts extending over only one-half of the surface of the dowel bore. If an anchoring engagement over a longer axial section of the dowel body is required, in another embodiment of the invention each spiral part can be formed of at least two wound parts each with an oppositely directed pitch.

A uniform distribution of the expanding force acting on the surface of the dowel bore can be provided in accordance with another embodiment of the invention where each spiral part is formed of wound sections crossing one another and extending essentially over one-half of the circumference of the dowel bore. Such crossing wound sections have oppositely directed pitches. Each spirally shaped part can be made up of two or more wound sections crossing one another and arranged one behind the other in the axial direction whereby the radially expanding forces can be distributed over a longer axially extending section of the dowel body.

The thickness of the spirally shaped body preferably corresponds to the wall thickness of the dowel body. Economic considerations particularly favor such an arrangement.

For economic and handling reasons it is advantageous, in accordance with the present invention, if the spirally shaped body is formed as a single unit with the dowel body. In such an arrangement, the expansion dowel can be produced in a punching or bending process. In a single unit arrangement of the dowel body and the spirally shaped body, the problem of securing the spirally shaped body in the dowel body or the danger of loss of the spirally shaped body is avoided. Moreover, the single unit design permits the utilization of the expansion dowel in a so-called throughbore, if the receiving material forming the throughbore can afford axial support for the dowel body.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 5 is an axially extending section of another embodiment of an expansion dowel in accordance with the present invention;

FIG. 6 is a sectional view taken along the line VI—VI in FIG. 5;

FIG. 7 is a developed view of the expansion dowel displayed in FIG. 5 and formed from a single blank;

FIG. 8 is an axially extending sectional view of another embodiment of an expansion dowel in accordance with the present invention;

FIG. 9 is a developed view of the expansion dowel exibited in FIG. 8 and formed from a single blank;

DETAILED DESCRIPTION OF THE INVENTION

Figure 1:
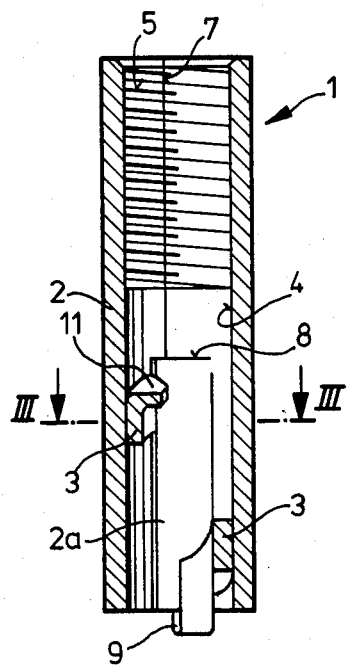
FIG. 1 illustrates an expansion dowel embodying the present invention in axially extending section.

An expansion dowel assembly 1 is illustrated in FIG. 1 and is made up of an axially extending dowel body 2 and a spirally shaped body 3 formed as a single unit with the dowel body. The spirally shaped body forms an expansion element for the dowel body. As viewed in FIG. 1 the lower end of the dowel body is the leading end when it is inserted into a borehole in a receiving material. The trailing end of the dowel body is its upper end as viewed in FIG. 1. As shown clearly in FIG. 2, the dowel body is a rolled sheet metal sleeve with an axially extending bore 4 located between its leading and trailing ends with a thread 5 formed on the inside of the bore from adjacent the trailing end toward the leading end. The thread 5 serves for the application of a load on the expansion dowel assembly after the dowel body has been anchored in place. From its leading end the dowel body 2 is divided into half-shell shaped sections by an axially extending slot 6, note FIG. 3, and by a butt joint 7 formed in the production operation. While the slot 6 extends only for approximately half of the axial length of the dowel body the butt joint 7 extends for its full axial length.

Figure 2:
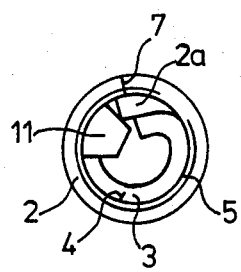
FIG. 2 is a plan view of the expansion dowel shown in FIG. 1.
Figure 3:
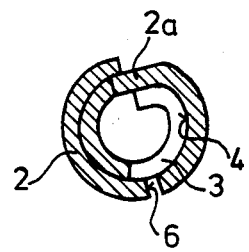
FIG. 3 is a sectional view of the expansion dowel shown in FIG. 1 taken along the line III—III.

As can be seen in FIGS. 2 and 3 an axially extending edge zone 2a of the dowel body extending along the butt joint 7 is bent inwardly into the dowel bore 4. The axial extent of the bent edge zone 2a is limited by the leading end of the bore and by a slit 8 extending transversely of the axis of the dowel body 2, note the slit 8 shown in FIGS. 1 and 4.

Figure 4:
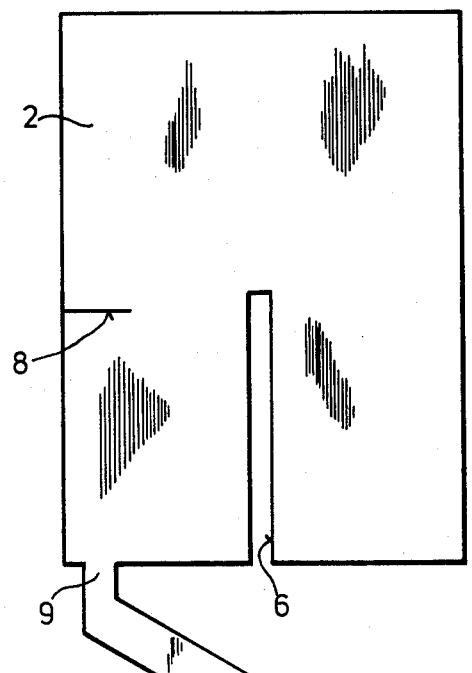
FIG. 4 is a developed view of the expansion dowel shown in FIG. 1 and fabricated from a single blank.

As can be seen in FIGS. 1 and 4, the spirally shaped body 3 is connected to the leading end of the dowel body 2 by a web 9 and extends for approximately one turn or wound section around the entire surface of the dowel bore 4. The spirally shaped body 3 has a free end formed with an impact protrusion 11 arranged in the shape of an angle and bent radially inwardly toward the axis of the bore 4. Note FIG. 1 showing the free end of the spirally shaped body located adjacent the slit 8. By inserting a rod-like tool into the dowel body from the trailing end thereof, the tool bears against the impact protrusion 11 and the spirally shaped body can be axially displaced toward the leading end of the dowel body causing a reduction in its pitch. As the pitch is reduced, the spirally shaped body 3 expands radially outwardly and causes a radial expansion of the dowel body in the axially extending region of the axial slot 6. Accordingly, the expansion dowel can be anchored in a receiving material.

In the developed view of the expansion dowel depicted in FIG. 4, the dowel is formed from a single blank with the dowel body 2 initially having a rectangular shape. The longitudinal slot 6 extends from the leading end of the dowel body or blank to slightly beyond the transverse slit 8. The strip-like spirally shaped body 3 is connected to the leading end of the dowel body by the web 9 and it has the impact protrusion 11 spaced outwardly from the leading end of the blank. As can be seen in FIG. 1 when the blank in FIG. 5 is rolled into the desired shape of the dowel body the web is bent so that the spiral body extends into the bore formed within the dowel body and follows around the surface of the bore in a spiral-like or helical-like form.

Another expansion dowel 21 is shown in FIG. 5 and is constituted by a sleeve-like dowel body 22 and a spirally shaped body 23. The bore 24 extending from the leading end to the trailing end of the dowel body has a thread 25 formed at the trailing end. The thread can be formed either before or after the rolling of the dowel body. In the axial direction, the dowel body 22 is divided into two half-shell shaped sections by an axially extending slot 26 which runs from the leading end of the dowel body for approximately half of its axial length. In addition, as in the embodiment in FIG. 1, a butt joint 27 extends between the leading end and the trailing end of the dowel body and, in combination with the axial slot 26, divides the dowel body into the two half-shell sections.

As can be seen in FIG. 6, the spirally shaped body is made up of two spirally shaped parts 28, 29 each attached to the leading end of the dowel body by a web 31, 32 so that the parts are formed as a unit with the dowel body. Each of the spirally shaped parts 28, 29 extends as a wound section or turn extending for half of the circumference of the bore 24. Further, each spirally shaped part has a pitch oriented oppositely to the other.

The developed view shown in FIG. 7 points out that the dowel body 22 and the expanding spirally shaped body 23 is formed as a unit from a single blank. Initially, the dowel body has a rectangular shape with an axial slot 26 extending from the leading end toward the trailing end of the dowel body or blank. The two spirally shaped parts 28, 29 are joined to the dowel body or blank by the webs 31, 32. It can be appreciated that the spirally shaped parts 28, 29 are bent upwardly, as viewed in FIG. 7 into the interior of the bore when the dowel body 22 is rolled so that the parts each extend in an opposite direction relative to the other around the inside of the bore. As compared to FIG. 4, in FIG. 7 the axially extending dimension of the spirally shaped parts 28, 29 is considerably greater than of the spirally shaped body 3.

In FIG. 8 another embodiment shows an expansion dowel 41 formed of a dowel body 42 and a spirally shaped body 43. The dowel body 42 has a bore 44 extending between its leading and trailing ends and it has a thread 45 extending from the trailing end toward the leading end for something less than half of the axial length of the dowel body. From the leading end of the dowel body 42, an axially extending slot is formed extending approximately over half of the axial length of the dowel body. Along with the butt joint 47 formed when the dowel body is rolled, the combination of the axial slot 46 and the butt joint 47 divides the dowel body from the leading end into two half-shell sections with the axial length of the sections being determined by the end of the slot 46 spaced from the leading end of the dowel body.

Spirally shaped body 43 is made up of two spirally shaped parts 48, 49 each secured to the leading end of the dowel body by a pair of webs 51, 52. Each spirally shaped part 48, 49 has a X-shaped configuration each having two wound sections 48a, 48b and 49a, 49b which cross one another and extend ith oppositely directed pitches within the dowel body. Each wound section extends for one-half of the circumference of the bore 44.

The shape of the blank used to form the dowel body 42 can be seen in FIG. 9 where, initially, the dowel body 42 has a planar rectangular shape with an axially extending slot 46 extending from one end of the blank toward the other for approximately one-half the length of the blank. Before being bent into the position shown in FIG. 8, the two spirally shaped parts 48, 49 extend outwardly from the leading end of the blank and each of the wound sections 48a, 48b and 49a, 49b cross one another providing the X-shaped appearance.

To anchor the expansion dowels 21, 41, the spirally shaped bodies 23, 43, are displaced axially toward the leading end of the dowel body 22, 42 by applying an axial force against the trailing ends of the spirally shaped bodies as viewed in FIG. 8 so that the axial displacement of the spirally shaped bodies results in a radially expanding effect of the leading end part of the dowel body as described with regard to the expansion dowel illustrated in FIGS. 1 to 4.

Figure 12:
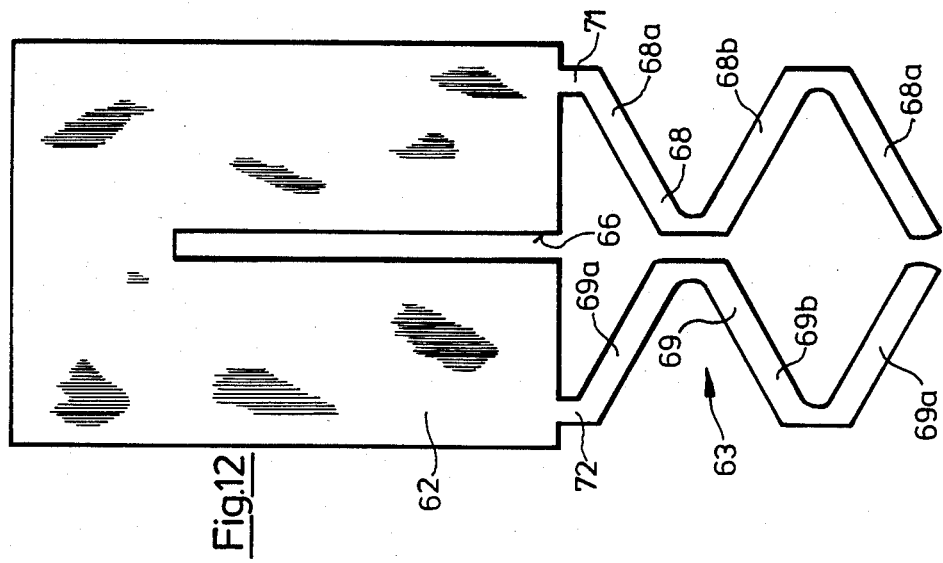
FIG. 12 is a developed view of the expansion dowel shown in FIGS. 10 and 11 and formed from a single blank.
Figure 11:
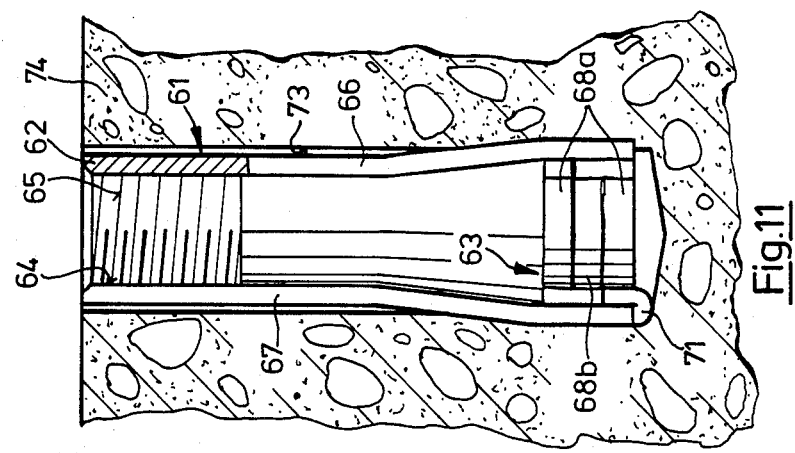
FIG. 11 is an axially extending sectional view of the expansion dowel illustrated in FIG. 10 with the dowel expanded in a receiving material borehole.
Figure 10:
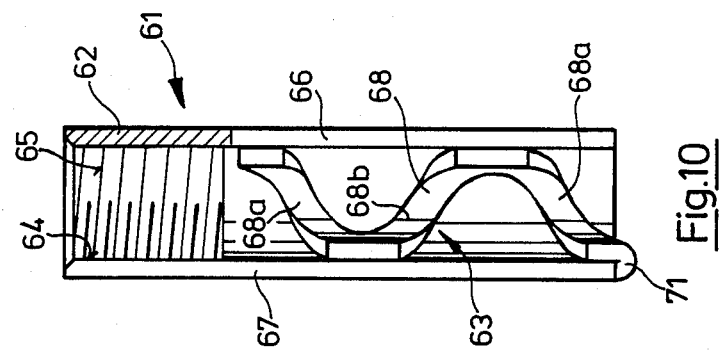
FIG. 10 is an axially extending sectional view of yet another expansion dowel embodying the present invention and shown prior to expansion.

In FIG. 10 another embodiment of the invention is displayed with an expansion dowel 61 constituted by an axially extending dowel body 62 and a spirally shaped body 63 extending in the axial direction within the bore 64 in the dowel body from its leading end toward the trailing end. It will be noted in FIG. 10 that the spirally shaped body 63 extends over a greater axial length of the dowel body than in the other embodiments described above. Accordingly, as can be seen in FIG. 12, an axial slot 66 extends from the leading end of the dowel body toward its trailing end to approximately the leading end of the thread 65 located in the trailing end section of the dowel body. As a result, the dowel body 62 is divided into two half-shell sections by the axial slot 66 and by the butt joint 67 extending over the full axial length of the dowel body.

As can be seen in FIG. 12, spirally shaped body 63 consists of two spirally shaped parts 68, 69 each of which is made up of a number of serially arranged wound sections 68a, 68b and 69a, 69b with each wound section having an oppositely directed pitch relative to the other. Each spirally shaped part 68, 69 is formed monolithically with the dowel body 62 by webs 71, 72. When the dowel body is formed into the rolled configuration shown in FIG. 10, the spirally shaped parts are bent at the webs 71, 72 into the bore in the dowel body so that the lower end of the spirally shaped parts as viewed in FIG. 12 become the trailing end parts as viewed in FIG. 10.

To anchor the expansion dowel 61, its leading end is inserted first into a prefabricated borehole 73 in a receiving material 74, such as concrete, and the insertion operation is continued until the bent webs 71, 72 abut the base of the borehole 73. Subsequently, using a rod-like tool inserted through the trailing end of the dowel body into contact with the trailing ends of the spirally shaped parts 68, 69 of the spirally shaped body 63, by driving the tool in the axial direction into the bore 64, the parts 68, 69 are displaced or deformed in the axial direction with a resultant radial expansion being developed by the action of the spirally shaped parts 68, 69 against the surface of the bore 64. Accordingly, commencing at its leading end, the dowel body 62 is expanded radially outwardly in the borehole 73 providing the desired anchoring effect. After the expanding tool is removed from the bore 64, the expansion dowel 61 can carry a load such as by attaching a fastening element into the thread 65.

In FIG. 12 the developed view of the expansion dowel 61 shows the initial planar rectangular shape of the dowel body 62 with the longitudinal slot 66 dividing the dowel body in the axial direction along with the joint 67 formed by the opposite long edges of the rectangular shaped part of the dowel body. The spirally shaped body 63 is formed of the two spirally shaped parts 68, 69 each made up of a a number of partial wound sections 68a, 68b and 69a, 69b which are attached by the webs 71, 72 to the leading end of the rectangular shaped dowel body in FIG. 12.

While specific embodiments of the invention have been shown and described in detail to illustrate the application of the inventive principles, it will be understood that the invention may be embodied otherwise without departing from such principles.

I claim:

1. Expansion dowel comprising an axially elongated sleeve-shaped dowel body having a leading end for insertion first into a borehole and a trailing end, said dowel body forming a bore extending between the leading and trailing ends thereof, said dowel body having axially extending slits therein extending from the leading end toward the trailing end, an expansion element located in the bore in said dowel body in the axially extending region of said slits, said dowel body being radially expandale by displacing said expansion elements in the axial direction of said body toward the leading end thereof, said expansion element is a spirally shaped member with the spiral axis thereof extending in the axial direction of said dowel body and said spirally shaped member having a pitch whereby the pitch of said spirally shaped member decreases when said spirally shaped member is axially displaced toward the leading end and results in an increase in the radially outer diameter thereof for radially expanding said dowel body, said spirally shaped member comprises two spirally shaped parts each having a wound section extending for approximately one-half of the circumference of the dowel body bore with the pitch of said wound sections oriented opppositely to one another.

2. Expansion dowel, as set forth in claim 1, wherein each said spirally shaped part comprises at least two wound sections with the pitch of said wound section directed oppositely to the pitch of the other said wound section.

3. Expansion dowel, as set forth in claim 2, wherein said at least two wound sections each extend for approximately one-half of the circumference of the dowel body bore with said wound sections crossing one another.

4. Expansion dowel, as set forth in claim 1, wherein said spirally shaped member has a thickness corresponding to the wall thickness of said dowel body.

5. Expansion dowel, as set forth in claim 1, wherein said spirally shaped body is formed as a single unit with said dowel body.

6. Expansion dowel comprising an axially elongated sleeve-shaped dowel body having a leading end for insertion first into a borehole and a trailing end, said dowel body forming a bore extending between the leading and trailing ends thereof, said dowel body having axially extending slits therein extending from the leading end toward the trailing end, an expansion element located in the bore in said dowel body in the axially extending region of said slits, said dowel body being radially expandable by displacing said expansion element in the axial direction of said body toward the leading end thereof, said expansion element is a spirally shaped member with the spiral axis thereof extending in the axial direction of said dowel body and said spirally shaped member having a pitch whereby the pitch of said spirally shaped member decreases when said spirally shaped member is axially displaced toward the leading end and results in an increase in the radially outer diameter thereof for radially expanding said dowel body, said spirally shaped body comprises a web section connecting the leading end of said dowel body to said spirally shaped body, and a wound section extending from said web within the dowel body bore toward the trailing end of said dowel body for an axial length less than the full length of said body.

7. Expansion dowel, as set forth in claim 6, wherein said spirally shaped member comprises a wound section extending around the spiral axis for the full circumference of the dowel body bore.

* * * * *